No. 726,367. PATENTED APR. 28, 1903.
E. STEVENS & C. TERBORG.
RAILWAY GATE SIGNAL.
APPLICATION FILED SEPT. 6, 1902.
NO MODEL.
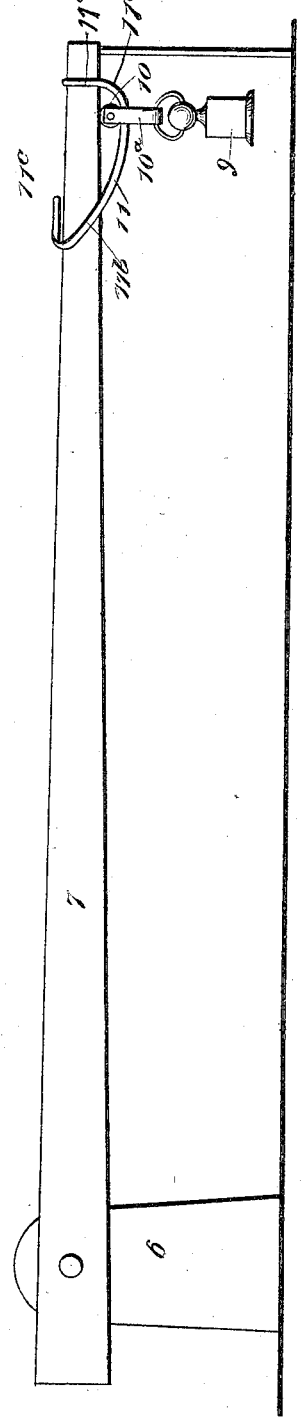
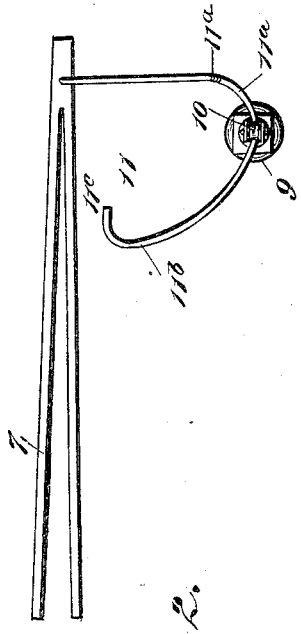
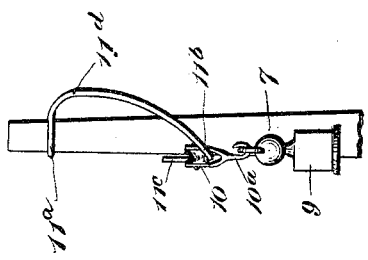
Witnesses
F. A. Barrow
Geo. E. Tew
Inventors
Egbert Stevens and
Christian Terborg
by Milo B. Stevens & Co.
Attorneys

UNITED STATES PATENT OFFICE.

EGBERT STEVENS, OF MODESTO, CALIFORNIA, AND CHRISTIAN TERBORG, OF CHICAGO, ILLINOIS.

RAILWAY-GATE SIGNAL.

SPECIFICATION forming part of Letters Patent No. 726,367, dated April 28, 1903.

Application filed September 6, 1902. Serial No. 122,433. (No model.)

*To all whom it may concern:*

Be it known that we, EGBERT STEVENS, residing at Modesto, California, and CHRISTIAN TERBORG, residing at Chicago, in the county of Cook and State of Illinois, citizens of the United States, have invented certain new and useful Improvements in Railway-Gate Signals; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of this invention is to provide a railway-gate with a signal-lantern which in consequence of the movement of the gate will swing automatically to show the red light or other danger-signal to the street when the gate is lowered and to show the same signal to the road when the gate is up.

The lantern used in carrying out the invention is preferably four-sided, showing red lights in two opposite directions and green or white lights in two directions at right angles to the red light.

The invention is illustrated in the accompanying drawings, in which—

Figure 1 is a side elevation of the device with the gate lowered. Fig. 2 is a fragmentary elevation showing the signal when the gate is raised. Fig. 3 is a top plan view, part of the gate being broken away.

Referring specifically to the drawings, 6 indicates the gate-post, and 7 the gate, pivoted thereto and swinging vertically, as is usual.

The lantern is indicated at 9 and hangs by a pulley-block 10 from an arm 11, secured to the end of the gate. The hook $10^a$ of the block is broad or flat, so that the lantern will not turn therein.

The action of the lantern depends upon the shape in which the arm 11 is curved. From the point at which it is fastened to the gate it extends straight laterally and horizontally a sufficient distance, so that the lantern will not strike or interfere with the gate. Then the arm is curved to form a quarter of a helix. With respect to its horizontal plane it is curved to form a quadrant, and with respect to its vertical plane it has an inclination downward from its point of attachment to the straight portion, as at $11^a$, and then upward in a helical curve, as at $11^b$. When the gate is lowered, the lantern hangs in the portion $11^a$ and exhibits the red light perpendicularly to the gate. When the gate is lifted, the block rolls down the arm to the portion $11^b$, where it hangs, and the quadrantal curve of the arm causes the block, and consequently the lantern, to make a quarter-turn, which has the effect of exhibiting the red light down the railroad and the green light to the street. The end of the arm is bent up, as at $11^c$, forming a hook to prevent the block rolling off when the gate is raised. When the gate is lowered, the operation is reversed, as will be understood. The downward curve of the arm at the end of the straight portion forms a stop, as at $11^d$, which prevents the lantern from rolling around too far. The arm is round in cross-section, and the block turns freely thereon, so that the lantern hangs vertically at all times.

When the gate is down, the red lights are exhibited to the street and the green lights to the road, and when the gate is up the green lights are exhibited to the street and the red lights to the road. This is advantageous to both the railroad employees and the persons using the street.

What we claim as new, and desire to secure by Letters Patent, is—

1. In a signal for railway-gates, the combination with a vertically-swinging gate, of a lantern hung therefrom, and means actuated by the swing of the gate to turn the lantern on its vertical axis.

2. In a signal for railway-gates, the combination with a vertically-swinging gate, of a lantern hung therefrom, automatically turning on its vertical axis when the gate is raised or lowered, substantially as described.

3. In a signal for railway-gates, the combination with a vertically-swinging gate, of a hanger-arm fixed to the gate, having a quadrantal curve, and a lantern hanging from and movable along the curve, whereby the lantern is given a quarter-turn when the gate is raised or lowered.

4. The combination with a vertically-swinging gate, of a quadrantal helical hanger-arm fixed to the gate, a pulley-block movable along the arm, as the gate is raised or lowered, and a lantern hanging from the pulley-block, substantially as described.

In testimony whereof we affix our signatures in presence of two witnesses.

EGBERT STEVENS.
        CHRISTIAN TERBORG.

Witnesses:
   NELLIE FELTSKOG,
   H. G. BATCHELOR.